3,180,416
PLASTIC COATING OF CEMENT NODULES
Floyd A. Smith, Houston, Tex., assignor, by mesne assignments, to Jersey Production Research Company, Tulsa, Okla., a corporation of Delaware
Filed Aug. 17, 1962, Ser. No. 217,716
2 Claims. (Cl. 166—33)

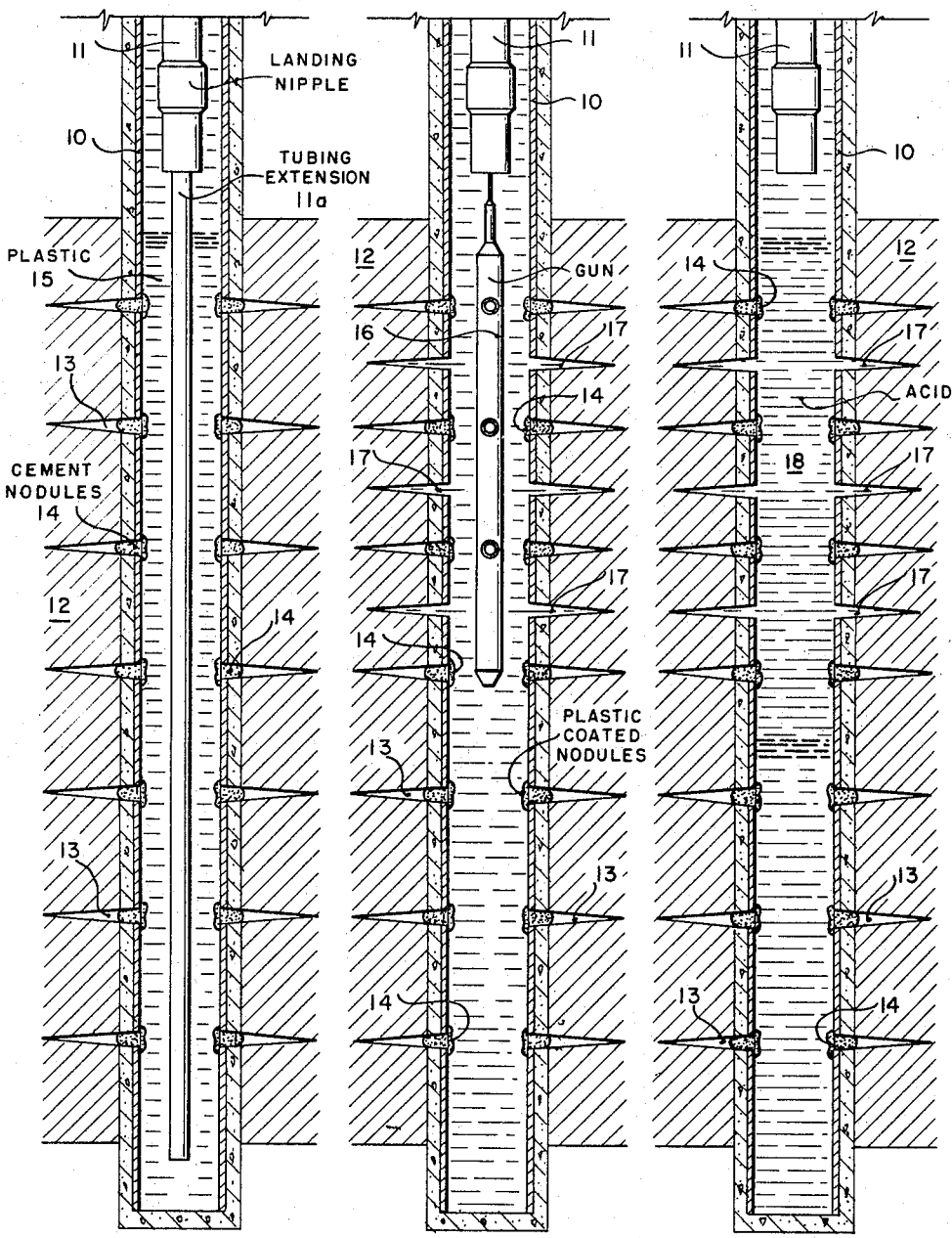
April 27, 1965 — F. A. SMITH — 3,180,416
PLASTIC COATING OF CEMENT NODULES
Filed Aug. 17, 1962
INVENTOR.
FLOYD A. SMITH,
ATTORNEY.

The present invention concerns coating with an acid-insoluble plastic, the cement nodules left in perforations made in well casing pipe adjacent a particular zone or zones following squeeze cementing so that acid may be spotted across new perforations subsequently made in the well casing pipe in the same zone or zones, or nearby zone or zones, without damaging the cement job performed on the old perforations.

Pinpoint stimulation techniques have often increased productivity of new wells more than four times that previously obtained by conventional stimulation. As used herein, "pinpoint stimulation" means perforating a limited number of holes in the casing pipe so that the perforations act as down-hole chokes which effectively distribute the stimulating fluid to all of the perforations. Unfortunately, application of pinpoint stimulation techniques to old wells having long perforated intervals is difficult because after the many existing perforations are squeezed with cement and the well casing is reperforated with a limited number of holes, to use the pinpoint stimulation techniques, it is frequently necessary to spot acid across the new perforations in order to reduce breakdown pressure prior to fracturing; or to utilize the acid itself as a stimulation fluid. Practically, it is impossible to spot acid across the new perforations or pump acid into the new perforations without also contacting the nodules of cement in the previously-squeezed perforations with acid and contacting these old perforations with acid breaks down the squeeze job and prevents use of the pinpoint stimulation techniques.

A primary object of the present invention is therefore to provide a method for contacting the new perforations with acid without permitting the acid to damage the old perforations which have been squeezed with cement.

Briefly, the invention comprises coating cement nodules contained in perforations previously made in well pipe adjacent a productive zone with an acid-insoluble plastic so that acid may be spotted across the new perforations subsequently made in the well pipe in the same zone or nearby zones without damaging the cement in the old perforations.

The above object and other objects and advantages of the invention will be apparent from a more detailed description thereof when taken with the drawings wherein:

FIGS. 1 to 3 show a well penetrating a subsurface productive interval and illustrate steps of the method of the invention.

In FIGS. 1 to 3 a well casing 10 containing a pipe 11 is shown penetrating a zone 12 containing petroleum fluids. Perforations 13 in casing 10 and zone 12 are shown plugged with nodules of cement 14.

As seen in FIG. 1, a plastic material insoluble in acid, designated numeral 15, is circulated into the well through pipe 11 and removable extension member 11a to adjacent zone 12 to wash the plastic across nodules 14 and coat them with plastic. After the cement nodules 14 have been coated with plastic in this manner, excess plastic may be reversed from the well by circulating fluid down casing 10 and up extension member 11a and pipe 11, or it is otherwise disposed of. Extension member 11a is removed and the plastic is then allowed to set.

As seen in FIG. 2, once the plastic has set, a wire line perforator 16 is lowered through pipe 11 to adjacent zone 12, and casing 10 and zone 12 are selectively perforated with a limited number of perforations 17.

As seen in FIG. 3, acid 18 is spotted across new perforations 17 without damage to the cement nodules 14 on the old perforations 13 because the cement has been protectively coated with the acid-insoluble plastic.

Various resins that may be used as the acid-insoluble plastic include epoxy resins as well as those of the phenol-formaldehyde type, cresol-formaldehyde, phenol-furfural, melamine-formaldehyde, urea-formaldehyde, allyl esters, etc.; the polyester solids formed from the interaction of unsaturated polyhydroxyalcohols with unsaturated di- or polycarboxylic acids; and plastic polymers formed from styrene and other liquid hydrocarbon monomers.

The technique of the invention may include an additional step if desired. A wetting agent may precede injection of the plastic to insure that the plastic adheres to and covers all of the exposed cement. Wetting agents that may be used include organochlorosilanes such as trichloromethylsilane, dichlorodimethylsilane, trichloroethylsilane, etc.

Having fully described the apparatus, objects, and method of my invention, I claim:

1. In a pinpoint stimulation method for use in a well in which perforations previously made in casing pipe adjacent a productive zone contain cement nodules resulting from squeeze cementing subsequent to making of the perforations, the improvement comprising: circulating into said well an acid insoluble plastic to coat said cement nodules with said plastic; reverse circulating excess plastic from said well; allowing said plastic to set; making new perforations in said casing pipe adjacent said productive zone according to the pinpoint stimulation technique; and then spotting acid across said new perforations without damage to the cement nodules on the old perforations.

2. A method as recited in claim 1 in which said cement nodules are treated with a wetting agent to insure that the plastic adheres to and covers all of the exposed cement nodules prior to circulating said acid insoluble plastic into said well.

References Cited by the Examiner
UNITED STATES PATENTS

| | | | |
|---|---|---|---|
| 2,252,271 | 8/41 | Mathis | 166—33 |
| 2,274,297 | 2/42 | Irons et al. | 166—33 X |
| 2,294,294 | 8/42 | Grebe | 166—33 |
| 2,911,048 | 11/59 | Dublin et al. | 166—43 X |
| 3,070,161 | 12/62 | Kerver et al. | 166—32 X |
| 3,097,692 | 7/63 | Holland et al. | 166—33 |

BENJAMIN HERSH, Primary Examiner.